Aug. 1, 1967 S. N. ANDRE 3,334,317

FERRITE STRIPLINE CIRCULATOR HAVING CLOSED MAGNETIC LOOP PATH AND CENTRALLY LOCATED CONDUCTIVE FOIL OVERLYING RADIALLY EXTENDING CENTER CONDUCTORS

Filed Jan. 31, 1964

INVENTOR.
STEPHEN N. ANDRE

BY Spencer E. Olson

ATTORNEY.

United States Patent Office 3,334,317

Patented Aug. 1, 1967

3,334,317

FERRITE STRIPLINE CIRCULATOR HAVING CLOSED MAGNETIC LOOP PATH AND CENTRALLY LOCATED, CONDUCTIVE FOIL OVERLYING RADIALLY EXTENDING CENTER CONDUCTORS

Stephen N. Andre, Tonawanda, N.Y., assignor to Sylvania Electric Products Inc., a corporation of Delaware Filed Jan. 31, 1964, Ser. No. 341,664
5 Claims. (Cl. 333—1.1)

ABSTRACT OF THE DISCLOSURE

In a strip transmission line circuit board having a pattern of printed circuit center conductors disposed between two ground planes, an integrally connected circulator comprising a symmetrical array of the center conductors extending from a hole through the circuit board and a conductive foil concentrically arranged in the hole to connect the center conductors together at a common point, the foil having a circular central portion and radially projecting arms disposed in contact with corresponding radially extending center conductors. Two ferrite disks are concentrically arranged in the hole on either side of the foil, and conductive plates enclosing each ferrite disk give the ground plane continuity. A biasing field is provided by a permanent magnet located at the circulator junction in a closed magnetic loop configuration so as to provide magnetic shielding for the circulator. The operational frequency range of the circulator is determined by the size of the ferrite disks, and optimization of performance at a fixed frequency within this range is obtained by varying the strength of the magnetic field and the length of the impedance matching sections forming part of the center conductors extending radially from the hole. Alternatively, the impedance matching sections may consist entirely of the radially projecting foil arms.

This invention relates generally to UHF and microwave circulators, and more particularly to an improved ferrite circulator construction wherein the circulator is integrally arranged in a solid dielectric strip transmission line circuit board.

A circulator is a multi-port, ferrite junction device for transferring microwave power from one selected port to another utilizing the non-reciprocal phase shift properties of the ferrite junction when magnetically biased to the vicinity of gyromagnetic resonance. Circulators have found acceptance in a number of microwave circuit applications, such as duplexers, isolators, attenuators, and switches. The application of prior art devices of this type has been limited, however, by their relatively large size and weight and complex design. Attempts by others to overcome these disadvantages are described in the following publications: IRE Transactions on Microwave Theory and Techniques, April 1959, pages 238–246; "A Strip-Line L-Band Compact Circulator," Proceedings of The IRE, January 1960, pages 115–116; "A Y-Junction Strip-Line Circulator," IRE Transactions on Microwave Theory and Techniques, May 1960, pages 346–351; Patent No. 3,063,024 entitled, "Microwave Strip Transmission Line Circulators," issued November 6, 1962; "Miniaturized Temperature Stable, Co-axial Y-Junction Circulators," IRE Transactions on Microwave Theory and Techniques, May 1961, pages 267–269; and Patent No. 3,085,212 entitled, "Tunable Circulators," issued April 9, 1963.

Although the circulators described in these publications represent improvements in the circulator art, it will be evident from the description to follow that they are not sufficiently compact and lightweight for applications such as space communication systems. In a satellite data transmission system, for example, employing an active adaptive phased array on a satellite for automatic transfer of information on a microwave carrier frequency from the satellite to an interrogating ground station, the phased array may include of the order of one hundred receiving elements and one hundred transmitting elements interconnected therewith to function as an adaptive array. Such a system further includes a reflection type, tunnel diode amplifier and mixer/modulator in the interconnecting line between each receiving and transmitting element pair. Since reflection type amplifiers generally require circulators to separate the incident and reflected waves, and a coupling between the amplifier output and the transmitting element to reduce the reflected signal from the transmitting element, two coupling circulators are also required in each element interconnecting circuit. This means that two hundred circulators are required in this satellite data transmission system. It is quite clear, therefore, that extremely compact and lightweight circulators and element interconnecting circuitry are required. An obviously desirable approach to this problem would be to adopt a modular concept and construct as much as possible of the interconnecting circuitry for each element pair on a single strip transmission line card.

Presently available circulators have several disadvantages which prohibit their use in such a system. The Davis patent and related publications, for example, describe a circulator having a symmetrical Y-junction of three flat-strip transmission lines using an air dielectric and containing two ferrite disks, co-axial connectors are employed at the circulator ports. To optimize circulator performance at a fixed frequency, the referenced art teaches that at least two parameters must be varied. Davis achieves optimum performance and impedance matching by adjusting the magnitude of the magnetic biasing field and the size of the ferrite disks. The Clark references describe a relatively complex strip transmission line Y-junction circulator employing co-axial connectors at the ports. Variable tuning is provided in this instance by adjusting the magnitude of the biasing field and the height and dielectric constant of dielectric sleeves about the ferrite disks. Each of these circulator types is relatively large, heavy, and not designed for integration with a tunnel diode amplifier. Also, since the circulator is an individual component with co-axial connectors at the ports, it is very bulky and not suited to an integrated strip transmission line system. Further, the impedance matching and performance optimization techniques employed by these prior art devices do not lend themselves to compactness and integration with other strip transmission line circuits.

It is accordingly a primary object of the present invention to provide a ferrite circulator of relatively simple design and extremely compact and light weight construction.

Another object of the invention is to provide a ferrite circulator fabricated of solid dielectric strip transmission line and adapted for integration with other strip transmission line circuitry.

Still another object of the present invention is to provide an easily implemented impedance matching technique for compact circulators integrally implemented in solid dielectric strip transmission circuit boards.

Another object of the invention is to provide an easily implemented impedance matching technique for increasing circulator bandwidth.

Another object of the invention is to provide a relatively low cost, easy to fabricate ferrite circulator.

Briefly, in accordance with the present invention, the above and other objects are achieved by means of a circulator employing a symmetrical Y-junction, strip transmission line configuration, wherein the radially extending center conductors of the junction are etched along with any other circuitry on a single solid dielectric strip transmission line circuit card. The circuit card has a hole centered at the common point of the Y-junction, and a conductive foil having a circular central portion of diameter less than the diameter of the hole and radially projecting arms is concentrically arranged in the hole to connect the center conductors together at said common point. Two ferrite disks are concentrically arranged in the hole on either side of the conductive foil, and a thin conductive disk enclosing each ferrite disk gives the ground plane continuity. The biasing field is provided by a permanent magnet assembled to the circulator junction in a closed magnetic loop configuration so as to provide magnetic shielding for the circulator. The operational frequency range of the circulator is determined by the size of the ferrite disks, and optimization of performance at a fixed center frequency within this range is obtained by varying the strength of the biasing field and the length of impedance matching sections forming part of the center conductors extending radially from the hole. Alternatively, the impedance matching sections of the center conductors may consist entirely of the radially projecting arms of the conductive foil, rather than being etched. Also, multiple section impedance transformers may be used for increasing the bandwidth of the circulator. This relatively simple fabrication technique provides a circulator of minimum size and weight which may be readily connected to associated strip transmission line circuitry, thereby eliminating bulky co-axial connectors.

Other objects, features and advantages of the invention will become apparent, and a better understanding of its construction and operation will be had from the following detailed description taken in conjunction with the accompaying drawings, in which.

Figures 1, 2, 3, 4:
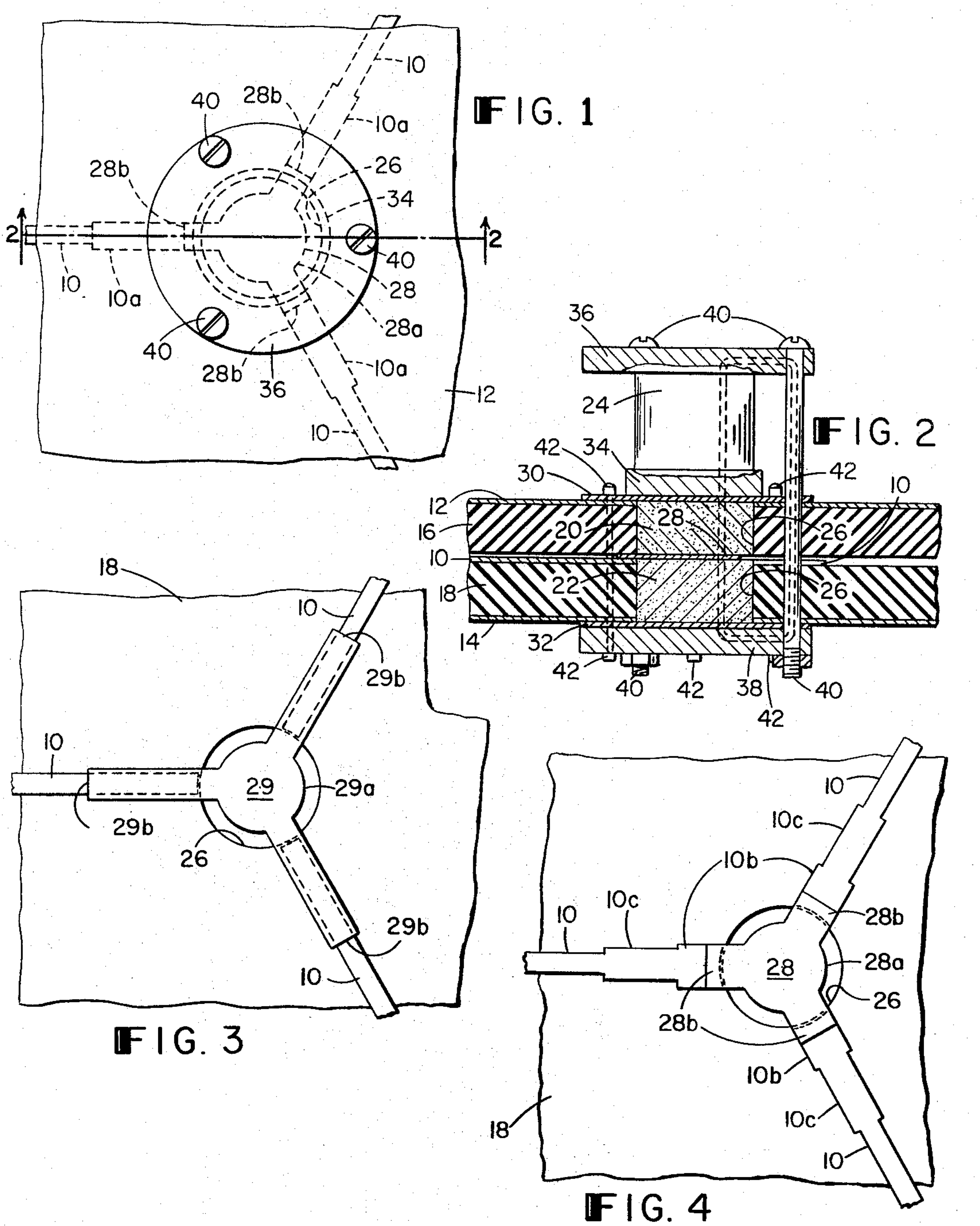
FIG. 1 is a fragmentary plan view of a strip transmission line circuit board containing a preferred embodiment of the ferrite circulator of the present invention.
FIG. 2 is an elevation cross-section view taken along line 2—2 of FIG. 1, the vertical dimension being greatly exaggerated for the sake of clarity.
FIG. 3 is a fragmentary plan view of the center conductor portion of the circulator illustrating an alternative construction thereof.
FIG. 4 is a fragmentary plan view of the center conductor portion of the circulator illustrating another alternative construction.

In the preferred embodiment shown in FIGS. 1 and 2, the circulator is contained in a solid dielectric strip transmission line circuit board having a pattern of printed circuit center conductors 10 supported between a pair of parallel ground planes 12 and 14, the center conductors 10 being spaced from the ground planes by solid dielectric boards 16 and 18, respectively. The circulator itself, in this instance a symmetrical Y-junction type, is integrally fabricated into the strip transmission line circuit board and generally comprises a symmetrical Y-configuration of center conductors 10, two ferrite disks 20 and 22, the ground planes 12 and 14, and a permanent magnet 24. The branched center conductors of the Y determine the ports of the circulator and may be integrally interconnected with any associated strip transmission line circuitry on the same circuit card.

More specifically, the circulator comprises a symmetrical array of printed circuit center conductors 10 radially extending from a circular hole 26 extending through the solid dielectric strip transmission line circuit board. Each of the radially extending center conductors 10 includes a relatively wider impedance matching section (or step-transformer) 10*a* of predetermined length from hole 26. In the present symmetrical Y-junction circulator, the radially extending array includes three center conductors having an equal angular displacement; i.e., each center conductor is positioned at an angle of 120° with respect to adjacent center conductors. A conductive foil 28 having a circular central portion 28*a* and radially projecting arms 28*b* is supported between dielectric boards 16 and 18 and concentrically disposed over hole 26. The radially projecting arms 28*b* of the foil correspond in position and width with the radially extending impedance matching sections 10*a* and are arranged to be in contact with respective conductors 10*a*, thereby electrically connecting the impedance matching sections 10*a* together at a common point. A pair of ferrite disks 20 and 22 are concentrically disposed in hole 26 on either side of conductive foil 28, the disks being of about the same thickness as dielectric boards 16 and 18, respectively. The ferrite disks are of predetermined diameter, hole 26 being of a diameter to accommodate them, and the diameter of central portion 28*a* of the conductive foil is somewhat smaller than the diameter of the ferrite disks, a ¾ ratio having been found to give optimum circulator performance. A pair of thin circular conductive plates 30 and 32 are positioned against ground planes 12 and 14, respectively, in axial alignment with the ferrite disks. The diameter of plates 30 and 32 is larger than the diameter of hole 26 so as to contact the respective ground planes about the periphery of the hole, thereby enclosing the ferrite disks and extending or completing the continuity of the ground planes.

A magnetic biasing structure is assembled to the circulator junction and comprises a permanent magnet disk 24 positioned above conductive plate 30 in axial alignment with ferrite disks 20 and 22 and a ferrous spacer 34 interposed between the magnet and conductive plate 30, the spacer 34 being provided to spread the magnetic field more uniformly over the ferrite material. The stacked assembly of plate 32, ferrite disk 22, foil 28, ferrite disk 20, plate 30, spacer 34, and permanent magnet disk 24 is contained between two thin circular plates 36 and 38 formed of ferrous material, such as iron, axially aligned with the stacked assembly, and is held together by three bolts 40 formed of ferrous material. The bolts 40, in addition to securing the assembly together close the magnetic circuit loop for biasing ferrite disks 20 and 22. As indicated by the dotted lines in FIG. 2, the closed loop is from permanent magnet 24, axially through ferrite disks 20 and 22, radially through ferrous plate 38, axially through the bolt 40, and radially through ferrous plate 36 back to the permanent magnet. The three closed magnetic circuits (one through each of bolts 40) very effectively shield the circulator from any stray magnetic fields. In an actual embodiment of this configuration, unshielded magnets of the same size and magnetism as magnet 24 could be brought within ½ inch of the circulator without affecting its performance.

The construction of the circulator illustrated in FIGS. 1 and 2 is greatly simplified over previously known designs since all of the impedance matching sections 10*a* can be etched along with other printed circuits on a single solid dielectric strip transmission line card. After etching, holes 26 of diameter appropriate to accommodate the ferrite disks may be punched in the solid dielectric boards. The foil conductor 28 may be pre-punched from a sheet of copper of approximately the same thickness as the copper foil on the strip transmission line, and is simply inserted as shown in FIGS. 1 and 2 with arms 28*b* overlapping the copper impedance matching sections 10*a* sufficiently to enable conductors 28*b* to be soldered to conductors 10*a* or held in place by other means. The fabrication is completed by inserting the ferrite disks into the holes in the dielectric, inserting the thin conductive plats or foil 30 and 32 over the ferrite disks to complete continuity on the ground plane, and assembling the permanent magnet and thin iron disks 32, 34 and 36. To enable convenient changing of the permanent magnet without loosening the strip transmission line board assembly, the vertical stacked assembly from plate 38 to plate 30 may be secured by means of miniature bolts 42.

It is well known that two parameters must be varied to optimize circulator performance for a fixed frequency range. In the devices described in the aforementioned references, combination of two or more of the following parameters are varied: magnetic field, ground plane spacing, size of ferrite, and dielectric rings of different dielectric constant and sizes. In the present invention, optimization of performance of the circulator is obtained by adjusting the magnetic field and length of the impedance matching section for a particular frequency. For a constant size of ferrite disk, this technique will achieve the desired result over a frequency range limited by the size of the disk. That is, the ferrite disk size (diameter in this instance) is chosen for a particular frequency range, and adjustment of the center frequency of the circulator is obtained within this range by variation of the magnitude of the magnetic field and the length of the impedance matching transformers.

The magnitude of the magnetic field is established by pre-selection of the thickness of the permanent magnet disk 24, and vernier adjustment is possible by small variations of the width of the gap (thickness of spacer 34) or by variations of the reluctance in the closed magnetic circuit; e.g., by using plates and bolts fabricated of a ferrous material having the desired permeability. The length of each impedance matching section or transformer **28*b*–10*a* is adjusted to be a quarter wavelength at the frequency of operation as measured from the periphery of central portion 28*a* of the foil 28 to the step in the printed center conductor. In FIG. 1, a single section impedance transformer is shown. Hence, the width of the impedance matching section is constant throughout its length and is governed by the impedance of the output leads of the circulator (conductors 10) and the mode impedance within the ferrite disks. For example, in one successfully operated embodiment, the width of the impedance matching section 28*b*–10*a* correspond to 25 ohm transmission line and the width of the center conductor 10** correspond to 50 ohm line.

Referring to FIG. 3, an alternative construction of center conductors 10 and the conductive foil, labeled 29, is illustrated. In this variation, the printed center conductors 10 extend radially from hole 26 with a constant width throughout their length. In lieu of the wider sections **10*a* of FIG. 1, the impedance transformers are formed by radially projecting arms 29*b* of conductive foil 29; foil 29 has a central portion 29*a* and arms 29*b* which correspond to the central portion 28*a* and arms 28*b* of foil 28, with the exception of the length of the arms. Each arm 29*b*** is adjusted to be one quarter wavelength at the frequency of operation. The FIG. 3 configuration provides a circulator having a more easily adjustable impedance transformer length, a feature which is advantageous in applications requiring impedance matching adjustments after initial adjustment.

For wider bandwidth operation, multiple section impedance transformers can be used as illustrated in FIG. 4. This impedance transformation method is well known in the strip transmission line art and, in its unique application to the present circulator, comprises the use of printed matching sections **10*b* and 10*c* in place of section 10*a* of FIG. 1 (of course, more than two matching sections may be used where desirable). Section 10*b* is wider than section 10*c*, thereby providing a lower line impedance, and combines with arms 28*b* to provide a constant width quarter wavelength impedance matching section (at the frequency of operation), as measured from the periphery of foil central portion 28*a* to the first step in the printed circuit conductor. Section 10*c* is of a constant width which is greater than 10 and smaller than 10*b*, thereby providing an intermediate line impedance, and extends a quarter wavelength at the frequency of operation beyond section 10*b*. As a variation, the multiple section transformers may be wholly determined by the arms of foil 28** in a manner analagous to that illustrated by FIG. 3.

The operation of the present circulator is similar to the Y-junction strip transmission line circulator described in the aforementioned publications, with the exception of the above described tuning techniques, and being well known, will not be described here.

From the foregoing it is seen that applicant has provided an easily implemented construction approach and matching technique, including means for increasing bandwidth, for strip transmission line circulators which enables integration with other circuits in a solid dielectric strip transmission line circuit board. The result is a low cost, extremely compact, and light weight assembly. The impedance matching methods used in prior art devices, namely variation of ground plane spacing, ferrite size, and dielectric ring parameters, obviously do not lend themselves to a comparably compact integrated assembly.

A circulator fabricated in accordance with FIGS. 1 and 2 and satisfactorily operated has the following physical characteristics: the ferrite disks 20 and 22 are each ¾" in diameter and 1/16" thick; dielectric boards 16 and 18 are each 1/16" thick; conductor 10 is 50 ohm line, and section **28*b*–10*a* is 25 ohm line one quarter wavelength long at a fixed center frequency of 2150 mc.; the central portion 28*a* of the foil has a diameter about ¾ that of the ferrite disks; permanent magnet 24 is ¾" in diameter and ⅛" thick; and, iron disks 32, 34 and 36** are each 1/32" thick. The resulting circulator assembly has an overall height of 0.35" and a total weight of 1.23 ounces, which includes five square inches of solid dielectric material for integration with other circuitry. The fixed center frequency may be adjusted within a range from 1800 mc. to 3000 mc. by variation of the magnetic field and length of the impedance matching sections. Employing single section impedance transformers, the circulator operated with a typical bandwidth of 200 mc. which remained relatively constant over this range. The magnetic field is about 200 gauss and only small changes about this value are required for tuning. The described circulator construction is not limited to the aforementioned frequency range, however, but is equally adaptable for frequencies anywhere from about 400 mc. to about 12,000 mc.

Although there has been described what are now considered to be preferred embodiments of the invention, modifications falling within the scope and spirit of the invention will occur to those skilled in the art. For example, magnetic biasing means other than the described permanent magnet structure may be used, such as an electro-magnetic circuit. Also, the present fabrication technique is not limited to Y-junction non-reciprocal devices, but is equally applicable to other types of junctions. It is the applicant's intention, therefore, that the invention not be limited by what has been specifically illustrated and described, except as such limitations appear in the appended claims.

What is claimed is:

1. In a strip transmission line circuit board having a pattern of printed circuit center conductors disposed between two ground planes, an integrally connected circulator comprising, in combination, a plurality of said center conductors arranged in a symmetrical array radially extending from a circular hole through said strip transmission line circuit board, a conductive foil concentrically disposed in said hole and electrically connecting said radially extending center conductors together at a common point, said conductive foil having a central portion contained within the perimeter of said hole and radially projecting arms corresponding in position wtih said radially extending center conductors, said radially projecting arms being arranged in contact with corresponding ones of said radially extending center conductors, two bodies of ferrite material of predetermined size concentrically disposed in said hole on either side of said conductive foil, a pair of conductive plates extending said ground planes and enclosing said ferrite bodies, a pair of plates formed of magnetically permeable material disposed on either side of said circuit board in axial alignment with said ferrite bodies, a magnet arranged in axial alignment with said ferrite bodies between one of said conductive plates and one of said plates of permeable material, and means formed of magnetically permeable material connecting said permeable plates for securing said magnet and permeable plates to said circuit board and providing a closed magnetic loop for magnetic shielding of said circulator.

2. A circulator in accordance with claim 1 wherein each of said radially extending center conductors includes a relatively wider impedance matching section extending radially a selected length from said hole, and the radially projecting arms of said conductive foil corresponds in width with said radially extending impedance matching sections and are arranged in contact with corresponding ones of said matching sections, the adjustment of the frequency of operation of said circulator being obtained by variation of the length of said impedance matching sections and field strength of said magnet.

3. A circulator in accordance with claim 1 wherein the radially projecting arms of said conductive foil are of selected length and wider than said center conductors for providing impedance matching, the adjustment of the frequency of operation of said circulator being obtained by variation of the length of the radially projecting arms of said conductive foil and the field strength of said magnet.

4. In a solid dielectric strip transmission line circuit board having a pattern of printed circuit center conductors disposed between two ground planes, said pattern of center conductors integrally interconnecting a plurality of circuits, an integrally connected circulator comprising, in combination, a plurality of said center conductors arranged in a symmetrical array radially extending from a circular hole through said strip transmission line circuit board, each of said printed circuit center conductors including a relatively wider impedance matching section extending radially a selected length from said hole, a conductive foil concentrically disposed in said hole and electrically connecting said impedance matching sections together at a common point, said conductive foil having a circular central portion of diameter less than the diameter of said hole and radially projecting arms corresponding in position and width with said radially extending impedance matching sections, said radially projecting arms being arranged in contact with corresponding ones of said impedance matching sections, two ferrite disks of predetermined size concentrically disposed in said hole on either side of said conductive foil, said ferrite disks having a diameter greater than the diameter of the central portion of said conductive foil, a pair of circular conductive plates extending said ground planes and enclosing said ferrite disks, a pair of plates formed of ferrous material disposed on either side of said circuit board in axial alignment with said conductive plates and said ferrite disks, a permanent magnet arranged in axial alignment with said ferrite disks between one of said conductive plates and one of said ferrous plates, a ferrous spacer disk concentrically disposed between said magnet and said conductive plate, and bolts formed of ferrous material connecting said ferrous plates, the frequency range of said circulator being determined by the size of said ferrite disks, and adjustment of the center frequency of said circulator within said frequency range being obtained by variation of the length of said impedance matching sections and the thickness of said magnet.

5. In a solid dielectric strip transmission line circuit board having a pattern of printed circuit center conductors disposed between two ground planes, said pattern of center conductors integrally interconnecting a plurality of circuits, an integrally connected circulator comprising, in combination, a plurality of said center conductors arranged in a symmetrical array extending radially from a circular hole through said strip transmission line circuit board, a conductive foil concentrically disposed in said hole for electrically connecting said center conductors together at a common point, said conductive foil having a circular central portion of diameter less than the diameter of said hole and radially projecting arms of selected length corresponding in position with said radially extending center conductors, said radially projecting arms being wider than said center conductors for providing impedance matching and arranged in contact with corresponding ones of said radially extending center conductors, two ferrite disks of selected size concentrically disposed in said hole on either side of said conductive foil, said ferrite disks having a diameter greater than the diameter of the central portion of said conductive foil, a pair of circular conductive plates extending said ground planes and enclosing said ferrite disks, a pair of plates formed of ferrous material disposed on either side of said circuit board in axial alignment with said conductive plates and said ferrite disks, a permanent magnet axially aligned with said ferrite disks between one of said conductive plates and one of said ferrous plates, a spacer disk formed of ferrous material concentrically disposed between said magnet and said conductive plate, and a plurality of bolts formed of ferrous material connecting said ferrous plates, the frequency range of said circulator being determined by the size of said ferrite disks, and adjustment of the center frequency of said circulator within said frequency range being obtained by variation of the length of the radially projecting arms of said conductive foil and the thickness of said magnet.

References Cited

UNITED STATES PATENTS

| | | | |
|---|---|---|---|
| 3,063,024 | 11/1962 | Davis | 333—1.1 |
| 3,085,212 | 4/1963 | Clark et al. | 333—1.1 |
| 3,185,941 | 5/1965 | Freiberg | 333—1.1 |

OTHER REFERENCES

Grace and Arams: Three-Port Ring Circulators, Proc. I.R.E.; August 1960, pp. 1947–1948.

"Ferrite Components," Melabs Catalog No. 8–1965–107. "Flying Saucer," 1964, page 11.

Bonfeld et al.: A Novel Strip-Line Circulator, IEEE Trans. on Microwave Theory and Techniques; February 1966, pp. 98–99.

Bland: Ferrite Y Circulator. IBM Tech. Disclosure; vol. 4, No. 10; March 1962, page 45.

HERMAN KARL SAALBACH, *Primary Examiner.*

R. COHN, P. L. GENSLER, *Assistant Examiners.*